United States Patent [19]
Kwak et al.

[11] Patent Number: 5,874,510
[45] Date of Patent: Feb. 23, 1999

[54] PROCESS FOR MAKING CROSSLINKED COPOLYMERS OF MALEIC ANHYDRIDE AND METHYL VINYL ETHER

[75] Inventors: Yoon Tae Kwak, Wayne; Stephen L. Kopolow, Plainsboro, both of N.J.

[73] Assignee: ISP Investments Inc., Wilmington, Del.

[21] Appl. No.: 932,996

[22] Filed: Sep. 18, 1997

[51] Int. Cl.$^6$ .................. C08F 222/06; C08F 216/14; C08F 212/34; C08F 2/14

[52] U.S. Cl. .................. 526/271; 526/216; 526/332; 526/336

[58] Field of Search .................. 526/271, 332, 526/336, 216

[56] References Cited

U.S. PATENT DOCUMENTS 4,952,558  8/1990  Goertz et al. .................. 526/216
5,034,488  7/1991  Tazi et al. .................. 526/271

*Primary Examiner*—Jeffrey T. Smith
*Assistant Examiner*—Wu C. Cheng
*Attorney, Agent, or Firm*—Walter Katz; William J. Davis; Marilyn J. Maue

[57] ABSTRACT

A process for making crosslinked polymers of maleic anhydride and methyl vinyl ether is described. The process is characterized by precharging methyl vinyl ether, partially or totally, in isopropyl acetate, and a crosslinker, and then continuously feeding molten maleic anhydride and methyl vinyl ether into the thus-precharged reactor. The monomer mixture then is polymerized at a temperature of about 60°–80° C. The reaction product is a pumpable, homogeneous suspension of the crosslinked copolymer at a solids level of about 30–50%, which is recoverable in high yield upon removal of the solvent and filtering the suspension.

9 Claims, No Drawings

PROCESS FOR MAKING CROSSLINKED COPOLYMERS OF MALEIC ANHYDRIDE AND METHYL VINYL ETHER

BACKGROUND OF THE INVENTION

1. Field of the Invention

This invention relates to crosslinked copolymers of maleic anhydride (MAN) and methyl vinyl ether (MVE), and, more particularly, to a process of making such crosslinked copolymers in high yield in the form of fine white powders, which, upon aqueous hydrolysis, can form clear gels.

2. Description of the Prior Art

Goertz, in U.S. Pat. No. 4,952,558, described a method of making copolymers of ethylenically unsaturated dicarboxylic anhydrides, e.g. maleic anhydride (MAN) and alkyl vinyl ethers, e.g. methyl vinyl ether (MVE). The Goertz process consisted of precharging solid MAN in isopropyl acetate, metering in the MVE and initiator, heating to boiling and filtering the resultant slurry. The product obtained was coarse powders of uncrosslinked copolymers. However, no examples were presented therein for making crosslinked copolymers.

Tazi, in U.S. Pat. No. 5,034,488, described a method of making crosslinked copolymers of MAN and MVE in a solvent system of cyclohexane and ethyl acetate.

Accordingly, an object of the invention is to provide a process for making crosslinked copolymers of maleic anhydride and methyl vinyl ether in high yield in the form of fine white powders.

Another object herein is to provide such crosslinked copolymer powders which can be readily hydrolyzed to form clear aqueous gels.

A feature of the invention is the provision of a process for making crosslinked copolymer powders of MAN and MVE, wherein molten MAN monomer is continuously fed into the precharged mixture of MVE and a suitable crosslinker.

Another feature herein is the provision of a filterable suspension of a crosslinked copolymer of MAN and MVE, at about a 30–50% solids level, from which fine white powders of the copolymer can be readily obtained.

These and other objects and features of the invention will be made apparent from the following more particular description of the invention.

DESCRIPTION OF THE INVENTION

A process is described herein for making a crosslinked polymer of maleic anhydride and methyl vinyl ether in high yield. The process comprises precharging methyl vinyl ether, partially or totally, in isopropyl acetate and a crosslinker, into a reactor maintained at about 60°–80° C. Then continuous separate streams of molten maleic anhydride and, if desired, the rest of methyl vinyl ether, are fed into the reactor. The reaction mixture then is polymerized at a temperature of about 60°–80° C. A pumpable, homogeneous suspension of the desired crosslinked copolymer at a solids level of about 20–50 wt. % is formed. The reaction product is then pumped from the reactor, the solvent is removed and the product is filtered. A fine white powder of the crosslinked copolymer is obtained.

In the preferred embodiments of the invention, the crosslinker is 1,9-decadiene, which is present in an amount of at least 2.5 weight %, the initiator is 2,2'-azobis(2-methylbutane-nitrile or decanoyl peroxide, an excess of methyl vinyl ether is present during the polymerization over the 1:1 mole ratio in the copolymer, the solids level of the resultant suspension is about 30–50%, and an excess of methyl vinyl ether is added continuously during the polymerization.

The copolymer powders obtained herein can be readily hydrolyzed in water, preferably in the presence of a surfactant, to provide clear aqueous gels of the hydrolyzed crosslinked copolymer.

The invention will now be described in further detail with the following invention and comparative examples.

EXAMPLE 1

A 1 liter autoclave reactor was precharged with 300 g of isopropylacetate and 3.84 g of 1,9-decadiene under a nitrogen atmosphere, and 240.29 ml (184.78 g) of methyl vinyl ether was added. The system then was heated to 72° C. Thereafter continuous addition of 77.995 g (60.09 ml) molten maleic anhydride into the reactor was commenced for 3 hours. An initiator, Vazo® 67 (2,2'-azobis(2-methylbutanenitrile)), at a 0.4% by weight level based on the total stoichiometric amounts of monomers was divided into 4 portions and fed four times. The reactants were held at that temperature for an additional 1 to 2 hours, cooled, vented and discharged. The resulting slurry, in which the crosslinked polymer product was present at an 47% solids level, was dried in a rotary evaporator and further dried in an air-forced oven at 65° C. Very fine, white powders were obtained having a Brookfield viscosity (RV#7, 20 rpm) of 10,200 cps at pH 6.50, and, 0.5% solids, clear aqueous gels were obtained.

EXAMPLE 2

The reactor was charged with 253.74 g of isopropylacetate and 3.84 g of 1,9-decadiene. Purging nitrogen to the reactor was performed. The system then was heated to 61° C. Thereafter continuous addition of separate streams of 77.995 g (60.09 ml) molten maleic anhydride and 92.391 g (120.14 ml) methyl vinyl ether into the reactor was commenced for 3 hours. An initiator, Decanox-F (decanoyl peroxide), at a 0.4% by weight level, based on the total stoichiometric amounts of monomers, was divided into 4 portions and fed four times. The reactants were held at that temperature for an additional 1 hour, cooled, vented and discharged. The resulting slurry, in which the crosslinked polymer product was present at an 37% solids level, was dried in a rotary evaporator and further dried in an air-forced oven at 65° C. Very fine, white powders were obtained having a Brookfield viscosity (RV#7, 20 rpm) of 78,200 cps at pH 7.06, and, 0.5% solids, clear aqueous gels were obtained.

EXAMPLE 3

The reactor was charged with 290.83 g of isopropylacetate and 1.530 g of pentaerythritol triallylether. Purging nitrogen to the reactor was performed. A small portion (11.92 ml) of methyl vinyl ether was precharged into the reactor. The system then was heated to 68° C. Thereafter continuous addition of separate streams of 80.100 g (61.71 ml) molten maleic anhydride and 45.833 g (59.60 ml) methyl vinyl ether into the reactor was commenced for 3 hours. An initiator, Vazo® 67 (2,2'-azobis(2-methylbutanenitrile)), at a 0.4% by weight level based on the total stoichiometric amounts of monomers was divided into 4 portions and fed four times. The reactants were held at that temperature for an additional 1 hour, cooled, vented and discharged. The resulting slurry, in which the crosslinked polymer product was present at an 31.4% solids level, was dried in a rotary evaporator and further dried in an air-forced oven at 65° C. Very fine, white powders were obtained having a Brookfield viscosity (RV#7, 20 rpm) of 27,480 cps at pH 6.76. At 0.5% solids, a clear gel is obtained.

EXAMPLE 4

The reactor was charged with 290.83 g of isopropylacetate and 1.530 g of butanediol divinylether. Purging nitrogen to the reactor was performed. A small portion (11.92 ml) of methyl vinyl ether was precharged into the reactor. The system then was heated to 68° C. Thereafter continuous addition of separate streams of 80.100 g (61.71 ml) molten maleic anhydride and 45.833 g (59.60 ml) methyl vinyl ether into the reactor was commenced for 3 hours. An initiator, Vazo® 67 (2,2'-azobis(2-methylbutanenitrile)), at a 0.4% by weight level based on the total stoichiometric amounts of monomers was divided into 4 portions and fed four times. The reactants were held at that temperature for an additional 1 hour, cooled, vented and discharged. The resulting slurry, in which the crosslinked polymer product was present at an 31.4% solids level, was dried in a rotary evaporator and further dried in an air-forced oven at 65° C. Very fine, white powders were obtained. However, no gel was obtained from the resulting polymer.

EXAMPLE 5

The reactor was charged with 253.74 g of isopropylacetate and 3.84 g of 1,9-decadiene. Purging nitrogen to the reactor was performed. The system then was heated to 61° C. Thereafter continuous addition of separate streams of 77.995 g (60.09 ml) molten maleic anhydride and 92.391 g (120.14 ml) methyl vinyl ether into the reactor was commenced for 3 hours. An initiator, Decanox-F (decanoyl peroxide), at a 0.4% by weight level based on the total stoichiometric amounts of monomers was divided into 4 portions and fed four times. The reactants were held at that temperature for an additional 1 hour, cooled, vented and discharged. 1 or 2% by weight of sodium dioctyl sulfosuccinate was added to the resulting slurry and shaken well. The resulting slurry, in which the crosslinked polymer product was present at an 37% solids level, was dried in a rotary evaporator and further dried in an air-forced oven at 65° C. Very fine, white powders were obtained. The dried powder wets well and contributes to a faster hydrolysis of the polymer. The Brookfield viscosity using (RV#7, 20 rpm) was 78,000 cps at pH 7.0. At 0.5% solids, a clear aqueous gel was obtained.

EXAMPLE 6

A 1 liter autoclave reactor was precharged with 200 g of isopropylacetate, 1.529 g of 1,9-decadiene, and 80.10 g (61.71 ml) of molten maleic anhydride. The reactor was purged with nitrogen. The system then was heated to 68° C. Thereafter continuous addition of 45.80 g (59.56 ml) methyl vinyl ether in 50 g isopropylacetate into the reactor was commenced for 4 hours. An initiator, Vazo® 67 (2,2'-azobis (2-methylbutanenitrile)), at a 0.4% by weight level based on the total stoichiometric amounts of monomers was dissolved in 50 g of isopropylacetate and fed into the reactor for 4 hours separately. The reactants were held at that temperature for an additional 1 to 2 hours, cooled, vented and discharged. The rubbery product was stuck on the agitator. An additional 70 ml of isopropylacetate was needed to recover the product. The resulting dispersion, was dried in a rotary evaporator and further dried in an air-forced oven at 65° C. Some yellow pieces of polymer were obtained; however no powder was observed, and the yellow polymer did not produce any gel in water.

EXAMPLE 7

A 1 liter autoclave reactor was precharged with 200 g of isopropylacetate, 2.569 g of butanediol divinyl ether, and 80.10 g (61.71 ml) of molten maleic anhydride. The reactor was purged with nitrogen. The system then was heated to 68° C. Thereafter continuous addition of 45.80 g (59.56 ml) methyl vinyl ether in 50 g isopropylacetate into the reactor was commenced for 4 hours. An initiator, Vazo® 67 (2,2'-azobis(2-methylbutanenitrile)), at a 0.4% by weight level based on the total stoichiometric amounts of monomers was dissolved in 50 g of isopropylacetate and fed into the reactor for 4 hours separately. The reactants were held at that temperature for an additional 1 to 2 hours, cooled, and vented. The agitator was held by the polymer mess. The resulting yellow-brown mess, in which the crosslinked polymer product was present at an 30% solids level, was dried in a rotary evaporator and further dried in an air-forced oven at 65° C. A few hard, yellow-brown pieces of polymer was obtained; however no fine powder was observed, and the reaction was considered incomplete. In water, the yellow-brown polymer did not provide any aqueous gel.

EXAMPLE 8

A 1 liter autoclave reactor was precharged with 200 g of isopropylacetate, 2.569 g of pentaerythritol triallylether, and 80.10 g (61.71 ml) of molten maleic anhydride. The reactor was purged with nitrogen. The system then was heated to 68° C. Thereafter continuous addition of 45.80 g (59.56 ml) methyl vinyl ether in 50 g isopropylacetate into the reactor was commenced for 4 hours. An initiator, Vazo® 67 (2,2'-azobis(2-methylbutanenitrile)), at a 0.4% by weight level based on the total stoichiometric amounts of monomers was dissolved in 50 g of isopropylacetate and fed into the reactor for 4 hours separately. The reactants were held at that temperature for an additional 1 to 2 hours, cooled, vented. The resulting polymer was sticky and gummy. The product had to be scooped out of the reactor. The resulting yellow product was dried in a rotary evaporator and further dried in an air-forced oven at 65° C. Some hard yellow pieces of polymer was obtained; however no powder was present. The reaction was considered incomplete. No gel was obtained from the resulting polymer.

The Invention and Comparative Examples above demonstrate that the invention process provides fine powders of crosslinked polymers of maleic anhydride and methyl vinyl ether suitable for making clear aqueous gels, while the Goertz procedure did not provide a powder product or a gel.

While the invention has been described with particular reference to certain embodiments thereof, it will be understood that changes and modifications may be made which are within the skill of the art. Accordingly, it is intended to be bound only by the following claims, in which:

What is claimed is:

1. A process for making a crosslinked polymer of maleic anhydride and methyl vinyl ether in high yield comprising precharging methyl vinyl ether, partially or totally, in isopropyl acetate and a crosslinker, into a reactor maintained at about 60°–80° C., then continuously feeding separate streams of molten maleic anhydride, and, if desired, the rest of methyl vinyl ether, into the reactor, polymerizing the mixture in the presence of a polymerization initiator, at a temperature of about 60°–80° C., to form a pumpable, homogeneous suspension of the crosslinked copolymer at a solids level of about 20–50 wt. %, pumping the reaction product from the reactor, removing the solvent and filtering.

2. A process according to claim 1 wherein the crosslinker is 1,9-decadiene.

3. A process according to claim 2 wherein the crosslinker is present in an amount of at least 2.5 weight %.

4. A process according to claim 2 wherein the initiator is 2,2'-azobis (2-methylbutanenitrile).

5. A process according to claim 1 wherein an excess of methyl vinyl ether is present during the polymerization over the 1:1 mole ratio in the copolymer.

6. A process according to claim 1 wherein the solids level of the suspension is about 30–40%.

7. A process according to claim 5 wherein the excess of methyl vinyl ether is added continuously during the polymerization.

8. A process according to claim 1 including the additional step of hydrolyzing the copolymer as a slurry in water to form a clear, aqueous gel of the hydrolyzed crosslinked copolymer.

9. A process according to claim 8 wherein a surfactant is included in the slurry.

* * * * *